United States Patent [19]

Bettini

[11] Patent Number: 4,693,654
[45] Date of Patent: Sep. 15, 1987

[54] SELF-DRILLING, SELF-TAPPING FASTENER

[75] Inventor: John E. Bettini, Elgin, Ill.

[73] Assignee: Illinois Tool Works Inc., Chicago, Ill.

[21] Appl. No.: 374,353

[22] Filed: May 3, 1982

Related U.S. Application Data

[63] Continuation of Ser. No. 128,211, Mar. 7, 1980, abandoned.

[51] Int. Cl.⁴ .............................................. F16B 25/00
[52] U.S. Cl. ..................................... 411/387; 408/224
[58] Field of Search ................. 411/386, 387; 10/140, 10/152 T; 408/199, 224, 225, 227-229

[56] References Cited

U.S. PATENT DOCUMENTS

| 2,174,578 | 10/1939 | Graham | 411/412 |
|---|---|---|---|
| 2,562,516 | 7/1951 | Williams | 72/365 |
| 3,093,028 | 6/1963 | Mathie | 411/387 |
| 3,207,023 | 9/1965 | Knohl | 411/387 |
| 3,207,024 | 9/1965 | Sommer | 411/387 |
| 3,221,588 | 12/1965 | Wieber | 411/387 |
| 3,438,299 | 4/1969 | Gotshall | 411/387 |
| 3,682,038 | 8/1972 | Lejdegard | 411/387 |
| 3,710,676 | 1/1973 | Ringland | 411/387 |
| 3,724,315 | 4/1973 | Sybnator | 411/386 |
| 3,942,405 | 3/1976 | Wagner | 411/386 |
| 4,222,689 | 9/1980 | Fujiwara | 411/387 |

FOREIGN PATENT DOCUMENTS

| 1475049 | 5/1969 | Fed. Rep. of Germany | 411/387 |
|---|---|---|---|
| 1293139 | 4/1962 | France | 408/199 |
| 7604239 | 10/1976 | Netherlands | 411/387 |

*Primary Examiner*—Lloyd A. Gall
*Attorney, Agent, or Firm*—David I. Roche; Thomas W. Buckman

[57] ABSTRACT

A self-drilling, self-tapping screw has a drill tip formed by a pair of conical segments. Each segment has a flat side and a rounded tip with one segment being longitudinally offset with respect to the other. The shorter, offset segment may have a greater included angle. At least a portion of the flat side of the second segment is coplanar with the flatside of the first segment. The screw preferably includes a quad-lead thread having two crests with a first diameter and two crests with a second larger diameter.

7 Claims, 7 Drawing Figures

SELF-DRILLING, SELF-TAPPING FASTENER

This is a continuation, of application Ser. No. 128,211, filed Mar. 7, 1980, and now abandoned.

BRIEF DESCRIPTION OF THE INVENTION

The present invention comprises an improved self-drilling, self-tapping screw. The drill point includes two half-conical segments with flat sides and rounded tips. The segments are longitudinally offset along the axis of the screw with respect to one another and portions of the flat sides are coplanar. The two angles included by the conical segments may be different with the angle of the segment nearer the head end preferably being the larger of the two. The self-tapping thread may take any of several forms: it may be a machine thread, a type B thread, or a quad-lead thread having two threads with a first crest diameter and two threads with a second larger crest diameter.

The screw of the present invention is particularly adapted for fastening wallboard or other panel material to steel studs. The self-drilling, self-tapping screw of the present invention has shown itself to be a faster driller than other drill screws, requires less complicated manufacturing steps and tooling to make and, therefore, can be manufactured more economically. Further, the conical segment positioned nearer the head extrudes the relatively thin metal in the stud during drilling providing greater thread engagement with the screw. This greater thread engagement results in higher pullout values (i.e., greater holding power) for the fastener. The embodiment utilizing the quad-lead thread can be utilized to further increase thread engagement due to its increased thread density. Although particularly adapted for steel studs, the fastener of the present invention can be utilized in wood applications without the need for modifying its configuration. The flatness of the drill tip prevents the flutes from packing with wall board particles which can prove troublesome for other screw configurations.

These and other features, objects and advantages of the present invention will become more apparent through reading the following specification in conjuction with the appended drawings.

DETAILED DESCRIPTION OF THE INVENTION

Figure 1:
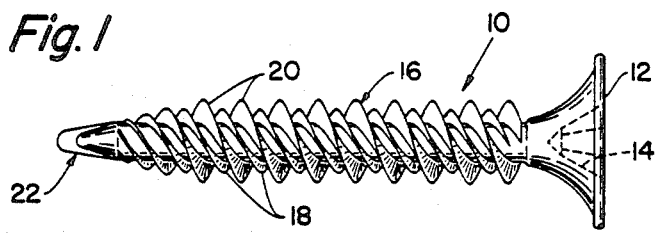
FIG. 1 is a top elevational view of the fastener of the present invention.
Figure 4:
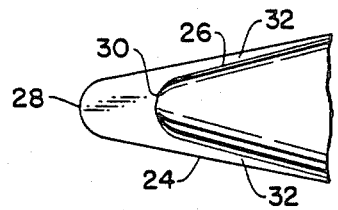
FIG. 4 is an enlarged top view of the drill tip of the fastener of the present invention.
Figure 3:
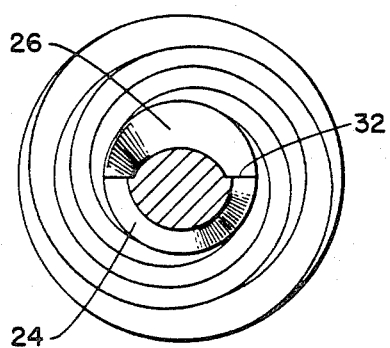
FIG. 3 is a partial end cross section taken along line 3—3 in FIG. 2.
Figure 2:
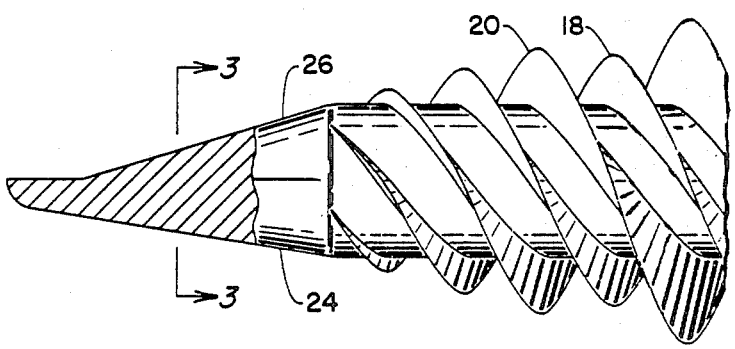
FIG. 2 is an enlarged side elevational view in partial section of the tip region of the fastener of FIG. 1.

The self-drilling, self-tapping screw of the present invention is shown generally at 10. The head 12 of the screw has the same general configuration shown in U.S. Pat. No. 3,056,234 which is hereby incorporated by reference. This head style has proven to be particularly well adapted for retention in wallboard or the like. Recess 14 provides a plurality of drive-engageable surfaces for rotationally driving the screw.

Threaded region 16 may, preferably, comprise a quad-lead thread configuration utilizing two threads 18 having a first crest diameter and two threads 20 having a second larger crest diameter. The drill tip shown generally at 22 comprises a first conical segment 24 and a second conical segment 26. Each segment has a flat side and a rounded tip 28, 30 respectively. Second segment 26 is longitudinally offset with respect to the first conical segment 24 toward head 12. In an alternate embodiment conical segment 26 also may have a larger included angle to make up for its shorter length. The flat sides of the two segments are partially coplanar.

As also will be clearly understood by reference to FIGS. 2, 3, 5 and 6, the axial offsetting of the conical segments, which have their flat surfaces lying along a hypothetical axial center line of a complete cone, will provide a tip that has an axially transverse dimension in the plane of the cutting edges which will be greater, at any axial position, than at any other axially transverse dimension at the same axial position in a longitudinal plane extending through the center line of the screw. This will clearly provide relief behind the cutting edges.

The offset between segments 24 and 26 creates two flute areas 32. Due to the drill tips symmetry, it is capable of drilling by rotation of the screw in either direction. This drill tip can, therefore, be incorporated on a screw employing a left hand thread without any modification of its configuration. As the drill tip 22 enters the steel stud, the second conical segment 26 engages the material and works it, extruding it out the back of the hole being formed. This extrusion increases the surface area of the aperture which is available for thread engagement by threaded region 16. The greater the thread engagement, the larger the pullout values, or holding strength, of the fastener. The quad-lead helps to further increase the holding strength due to the increased thread density.

Figure 7:
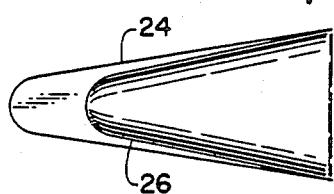
FIG. 7 is a top elevational view of the drill tip of the FIG. 5 embodiment.
Figure 6:
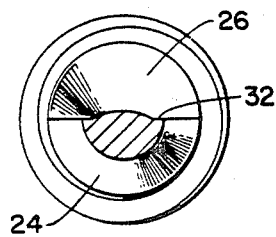
FIG. 6 is a cross-sectional end view taken along line 6—6 in FIG. 5.
Figure 5:
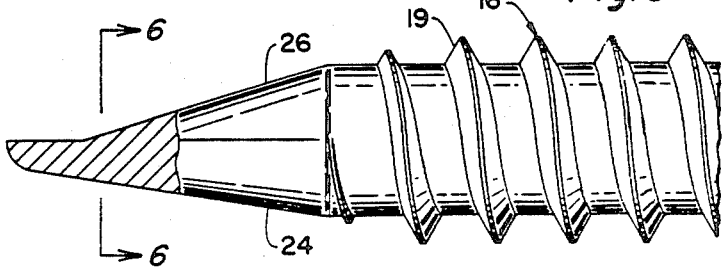
FIG. 5 is an enlarged side elevational view in partial section of another embodiment of the fastener of the present invention.

A second embodiment is depicted in FIGS. 5–7. In this embodiment, the included angle of conical segment 26 is comparatively larger with respect to segment 24 than in the previous embodiment. Further, whereas the flat side of each segment lay generally along the hypothetical axial center line in the FIG. 1–4 embodiments, the flat sides of this embodiment are off the center line giving the point a much flatter configuration. The threaded region 16 of this embodiment is shown with a type B thread but can have a machine thread or any other thread form which may be convenient.

The self-drilling, self-tapping screw of the present invention can penetrate wallboard or the like and drill into and fasten into a steel stud. Due to the configuration of the drill tip, the flutes will not become packed with particles of wallboard which can have a detrimental effect on other drill screws. Further, this drill tip extrudes the material of the stud as it drills thereby increasing the available material thickness for thread engagement. Lastly, this fastener is equally well adapted for use with wooden studs and need not be limited to steel stud applications.

Various changes, modifications and alternatives will become apparent to a person of ordinary skill in the art as a result of reading the foregoing specification. Accordingly, it is intended that all such changes, modifications and alternatives as come within the scope of the appended claims fall within the boundaries of the present invention.

I claim:

1. A self-drilling, self-tapping screw comprising a head with drive-engageable surfaces at one end; a drill point at the opposite end; and a threaded region intermediate said two ends; said drill point including a first conical segment with a flat side and a rounded tip, the edges of the flat side of said first conical segment creating a pair of cutting edges diverging from a continuously curved rounded tip at a relatively sharp acute angle, the cutting edges extending for a predetermined axial distance along the screw length, said first conical segment being at a first longitudinal position along the screw length, a second conical segment with a flat side and a rounded tip, said second conical segment being at a second longitudinal position along the screw length, said second longitudinal position being nearer the head than said first position and at least a portion of the two flat sides being coplanar, the entire surfaces of each conical segment being smooth, the flat side of the second conical segment being coplanar with the flat side of the first conical segment and defining a pair of side edges diverging from the rounded tip of said second conical segment at a relatively sharp acute angle, the side edges of said second conical segment being spaced radially inwardly from associated cutting edges on said first conical segment creating a pair of flat side segments radially inwardly of said cutting edges for a substantial portion of said predetermined axial distance, the axially transverse dimension of the drill point in a longitudinal plane intersecting the cutting edges at any given location being greater than any other axially transverse dimension in any other longitudinal plane intersecting the axis of the screw.

2. The self-drilling, self-tapping screw of claim 1 wherein the acute angle of the side edges of the second conical segment is different from the acute angle of the cutting edges of said first segment.

3. The self-drilling, self-tapping screw of claim 2 wherein the acute angle of said second conical segment is greater than the acute angle of said first conical segment.

4. The self-drilling, self-tapping screw of claim 1 wherein the threaded region of said screw includes at least one helical thread having a first predetermined crest diameter and at least one helical thread having a second predetermined crest diameter larger than said first diameter.

5. The self-drilling, self-tapping screw of claim 4 wherein said threaded region includes two threads with the first crest diameter and two threads having the second crest diameter.

6. The self-drilling, self-tapping screw of claim 1 wherein the flat side of each conical segment lies along the respective hypothetical cone's axial center line so that each conical segment comprising generally one radial half of a cone.

7. The self-drilling, self-tapping screw of claim 1 wherein the flat side of each conical segment lies off the respective hypothetical cone's axial center line so that each conical segment comprises less than one radial half of a cone.

* * * * *